(12) United States Patent
Swanson et al.

(10) Patent No.: US 9,022,769 B2
(45) Date of Patent: May 5, 2015

(54) MULTIPLE-ZONE LIQUEFIER ASSEMBLY FOR EXTRUSION-BASED ADDITIVE MANUFACTURING SYSTEMS

(75) Inventors: William J. Swanson, St. Paul, MN (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 996 days.

(21) Appl. No.: 12/841,341

(22) Filed: Jul. 22, 2010

(65) Prior Publication Data

US 2012/0018924 A1  Jan. 26, 2012

(51) Int. Cl.
  *B29C 47/86* (2006.01)
  *B29C 67/00* (2006.01)
  *B29C 47/00* (2006.01)
  *B29C 47/08* (2006.01)
  *B29C 47/12* (2006.01)

(52) U.S. Cl.
  CPC ......... *B29C 67/0055* (2013.01); *B29C 47/0014* (2013.01); *B29C 47/0866* (2013.01); *B29C 47/12* (2013.01)

(58) Field of Classification Search
  CPC .. B29C 47/86; B29C 47/862; B29C 67/0055; B29C 67/0059
  USPC ................................................ 425/375, 379.1
  See application file for complete search history.

(56) References Cited

U.S. PATENT DOCUMENTS

| 4,460,398 | A | * | 7/1984 | Sasaki ............................ 65/327 |
| 4,749,347 | A | | 6/1988 | Valavaara |
| 4,797,313 | A | | 1/1989 | Stolk et al. |
| 5,121,329 | A | | 6/1992 | Crump |
| 5,169,081 | A | | 12/1992 | Goedderz |
| 5,303,141 | A | | 4/1994 | Batchelder et al. |
| 5,312,224 | A | | 5/1994 | Batchelder et al. |
| 5,340,433 | A | | 8/1994 | Crump |
| 5,342,687 | A | | 8/1994 | Iwai et al. |
| 5,503,785 | A | | 4/1996 | Crump et al. |
| 5,738,817 | A | | 4/1998 | Danforth et al. |
| 5,764,521 | A | | 6/1998 | Batchelder et al. |
| 5,866,058 | A | | 2/1999 | Batchelder et al. |
| 5,939,008 | A | | 8/1999 | Comb et al. |
| 5,968,561 | A | | 10/1999 | Batchelder et al. |
| 6,004,124 | A | | 12/1999 | Swanson et al. |
| 6,022,207 | A | | 2/2000 | Dahlin et al. |
| 6,054,077 | A | | 4/2000 | Comb et al. |
| 6,067,480 | A | | 5/2000 | Stuffle et al. |
| 6,070,107 | A | | 5/2000 | Lombardi et al. |
| 6,085,957 | A | | 7/2000 | Zinniel et al. |
| 6,129,872 | A | | 10/2000 | Jang |
| 6,228,923 | B1 | | 5/2001 | Lombardi et al. |
| 6,238,613 | B1 | * | 5/2001 | Batchelder et al. ........... 264/404 |
| 6,257,517 | B1 | | 7/2001 | Babish et al. |
| 6,547,995 | B1 | | 4/2003 | Comb |

(Continued)

FOREIGN PATENT DOCUMENTS

GB  816016  7/1959

*Primary Examiner* — Yogendra Gupta
*Assistant Examiner* — Joseph Leyson
(74) *Attorney, Agent, or Firm* — Westerman, Champlin & Koehler, P.A.

(57) ABSTRACT

A liquefier assembly for use in an extrusion-based additive manufacturing system, and a method for building a three-dimensional model with the extrusion-based additive manufacturing system, where the liquefier assembly includes a liquefier tube having multiple, independently heatable zones along a longitudinal length of the liquefier tube.

20 Claims, 5 Drawing Sheets

(56) References Cited

U.S. PATENT DOCUMENTS

| | | |
|---|---|---|
| 6,645,412 B2 | 11/2003 | Priedeman, Jr. |
| 6,685,866 B2 | 2/2004 | Swanson et al. |
| 6,722,872 B1 | 4/2004 | Swanson et al. |
| 6,730,252 B1 | 5/2004 | Teoh et al. |
| 6,749,414 B1 | 6/2004 | Hanson et al. |
| 6,790,403 B1 | 9/2004 | Priedeman, Jr. et al. |
| 6,814,907 B1 | 11/2004 | Comb |
| 6,869,559 B2 | 3/2005 | Hopkins |
| 6,923,634 B2 | 8/2005 | Swanson et al. |
| 6,998,087 B1 | 2/2006 | Hanson et al. |
| 7,122,246 B2 | 10/2006 | Comb et al. |
| 7,172,715 B2 | 2/2007 | Swanson et al. |
| 7,363,686 B2 | 4/2008 | Fukuyasu et al. |
| 7,384,255 B2 | 6/2008 | LaBossiere et al. |
| 7,604,470 B2 | 10/2009 | LaBossiere et al. |
| 2007/0003656 A1 | 1/2007 | LaBossiere et al. |
| 2007/0228590 A1 | 10/2007 | LaBossiere et al. |
| 2009/0035405 A1 | 2/2009 | Leavitt |
| 2009/0263582 A1 | 10/2009 | Batchelder |
| 2009/0273122 A1 | 11/2009 | Batchelder et al. |
| 2009/0274540 A1 | 11/2009 | Batchelder et al. |
| 2010/0096072 A1 | 4/2010 | Hopkins et al. |
| 2010/0096485 A1 | 4/2010 | Taatjes et al. |
| 2010/0096489 A1 | 4/2010 | Taatjes et al. |

* cited by examiner

MULTIPLE-ZONE LIQUEFIER ASSEMBLY FOR EXTRUSION-BASED ADDITIVE MANUFACTURING SYSTEMS

BACKGROUND

The present disclosure relates to additive manufacturing systems for building three-dimensional (3D) models with layer-based additive manufacturing techniques. In particular, the present disclosure relates to liquefier assemblies for use in extrusion-based additive manufacturing systems.

An extrusion-based additive manufacturing system (e.g., fused deposition modeling systems developed by Stratasys, Inc., Eden Prairie, Minn.) is used to build a 3D model from a digital representation of the 3D model in a layer-by-layer manner by extruding a flowable consumable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D model resembling the digital representation.

Movement of the extrusion head with respect to the substrate is performed under computer control, in accordance with build data that represents the 3D model. The build data is obtained by initially slicing the digital representation of the 3D model into multiple horizontally sliced layers. Then, for each sliced layer, the host computer generates a build path for depositing roads of modeling material to form the 3D model.

In fabricating 3D models by depositing layers of a modeling material, supporting layers or structures are typically built underneath overhanging portions or in cavities of objects under construction, which are not supported by the modeling material itself. A support structure may be built utilizing the same deposition techniques by which the modeling material is deposited. The host computer generates additional geometry acting as a support structure for the overhanging or free-space segments of the 3D model being formed. Consumable support material is then deposited from a second nozzle pursuant to the generated geometry during the build process. The support material adheres to the modeling material during fabrication, and is removable from the completed 3D model when the build process is complete.

SUMMARY

A first aspect of the present disclosure is directed to a liquefier assembly for use in an extrusion-based additive manufacturing system. The liquefier assembly includes a liquefier tube having a first end and a second end offset along longitudinal length, and an extrusion tip secured to the first end of the liquefier tube. The liquefier assembly also includes a first thermal unit operably secured to the liquefier tube adjacent the first end of the liquefier tube, and a second thermal unit operably secured to the liquefier tube between the first thermal unit and the second end of the liquefier tube.

Another aspect of the present disclosure is directed to a liquefier assembly for use in an extrusion-based additive manufacturing system, where the liquefier assembly includes a liquefier tube having a first end and a second end offset along longitudinal length, and an extrusion tip secured to the first end of the liquefier tube. The liquefier assembly also includes a plurality of thermal units operably secured to the liquefier tube at different locations along the longitudinal length of the liquefier tube, where each of the plurality of thermal units is configured to be operated independently of each other.

Another aspect of the present disclosure is directed to a method for building a three-dimensional model with an extrusion-based additive manufacturing system having an extrusion head. The method includes providing a liquefier tube of the extrusion head having multiple heatable zones along a longitudinal length of the liquefier tube, and heating a first zone of the multiple heatable zones. The method also includes at least partially melting a portion of a filament of a thermoplastic material within the first segment of the liquefier tube, and extruding the molten thermoplastic material from an extrusion tip mounted to a bottom end of the liquefier tube.

DETAILED DESCRIPTION

While operating at steady state, a conventional liquefier has its maximum flow rate dictated by its heated length and the thermal diffusivity of the material being extruded. Thus, the longer liquefier is, the faster the system can build a 3D model or support structure. Additionally, a conventional liquefier, which typically includes an extrusion tip with a flow resistance that is large compared to the rest of the liquefier, has a response time that increases with the square of the heated length of the liquefier. Therefore, the longer the liquefier, the harder it is to change the flow rate quickly (i.e., a slower response time). This slower response time accordingly slows down the build speed when building 3D model and support structures.

Stated another way, when an extrusion head carrying a liquefier moves quickly through interior fill patterns of a 3D model or support structure, a longer liquefier is preferred. Alternatively, when the extrusion head traces surface details with numerous stops and starts, a shorter liquefier is preferred. Accordingly, a long heated portion of the liquefier provides a high flow rate and a slow time response, while a short heated portion of the liquefier provides a low flow rate and a fast time response.

For a given slice thickness and tip manufacturing technique, the tip inner diameter and tip axial length are typically fixed. Thus, the basic difference between a short and a long liquefier is the length of the heated section of a liquefier. Accordingly, as discussed below, the liquefier assembly of the present disclosure is capable of adjusting its heatable length to function as a variable-length liquefier. In particular, the liquefier assembly of the present disclosure includes multiple, independently heatable zones that adjust its overall heatable length. As such, the liquefier assembly may have a short heatable length when fast response times are desired (e.g., when tracing surface details with numerous stops and starts), and may have a long heatable length when fast flow rates are desired (e.g., through interior fill patterns).

Figure 1:
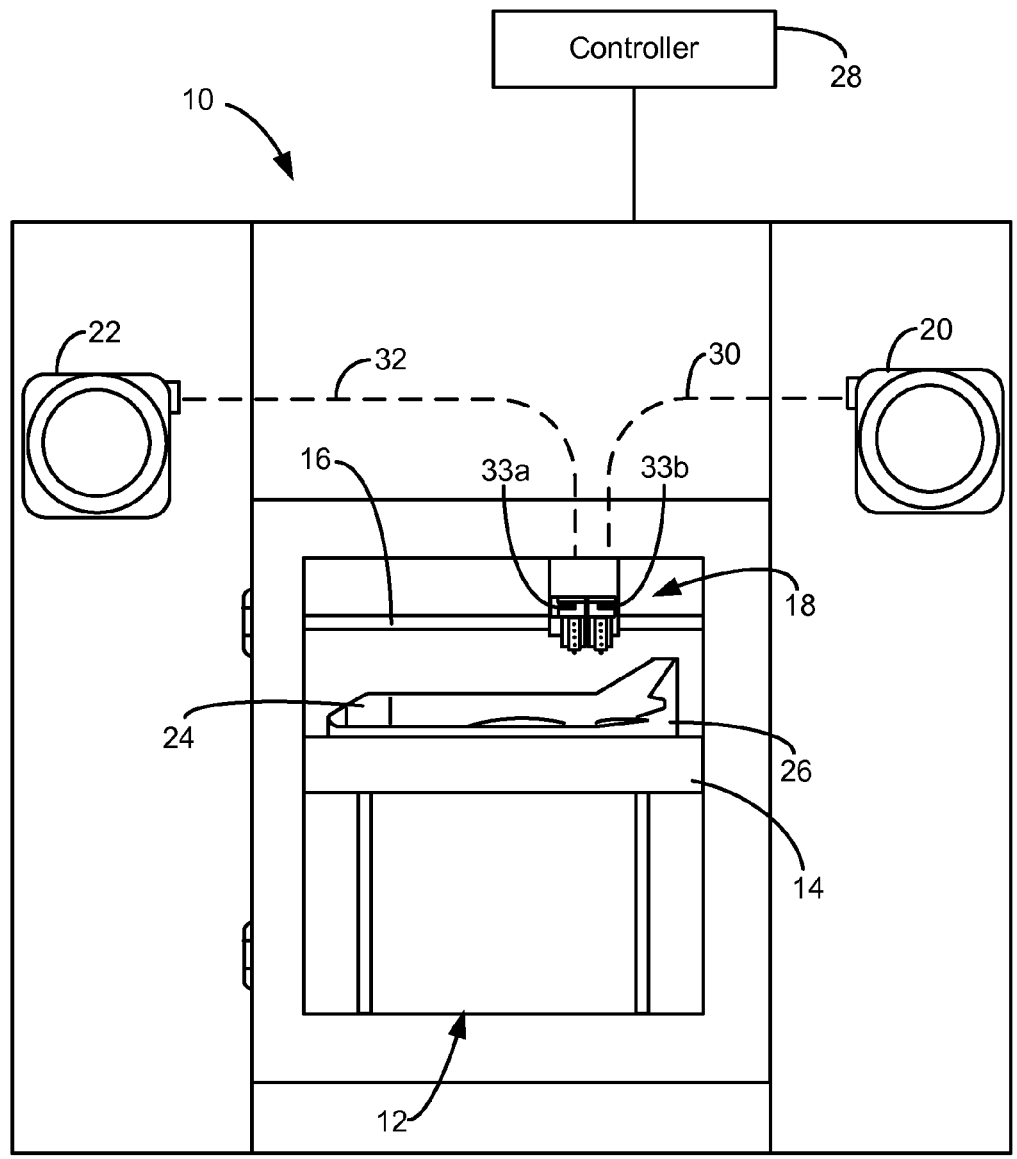
FIG. 1 is a front view of an extrusion-based additive manufacturing system that includes a liquefier assembly of the present disclosure.

As shown in FIG. 1, system 10 is an extrusion-based additive manufacturing system for building 3D models with the use of support structures, and includes build chamber 12, platen 14, gantry 16, extrusion head 18, and supply sources 20 and 22. Examples of suitable systems for system 10 include extrusion-based additive manufacturing systems, such as fused deposition modeling systems developed by Stratasys, Inc., Eden Prairie, Minn. As discussed below, extrusion head 18 may include one or more multiple-zone liquefier assemblies (not shown in FIG. 1) for melting successive portions of filaments (not shown in FIG. 1) during a build operation with system 10.

Build chamber 12 is an enclosed, heatable environment that contains platen 14, gantry 16, and extrusion head 18 for building a 3D model (referred to as 3D model 24) and a corresponding support structure (referred to as support structure 26). Platen 14 is a platform on which 3D model 24 and support structure 26 are built, and desirably moves along a vertical z-axis based on signals provided from computer-operated controller 28. Gantry 16 is a guide rail system that is desirably configured to move extrusion head 18 in a horizontal x-y plane within build chamber 12 based on signals provided from controller 28. The horizontal x-y plane is a plane defined by an x-axis and a y-axis (not shown in FIG. 1), where the x-axis, the y-axis, and the z-axis are orthogonal to each other. In an alternative embodiment, platen 14 may be configured to move in the horizontal x-y plane within build chamber 12, and extrusion head 18 may be configured to move along the z-axis. Other similar arrangements may also be used such that one or both of platen 14 and extrusion head 18 are moveable relative to each other.

Extrusion head 18 is supported by gantry 16 for building 3D model 24 and support structure 26 on platen 14 in a layer-by-layer manner, based on signals provided from controller 28. In the embodiment shown in FIG. 1, extrusion head 18 is a dual-tip extrusion head configured to deposit modeling and support materials from supply source 20 and supply source 22, respectively. Examples of suitable extrusion heads for extrusion head 18 include those disclosed in LaBossiere, et al., U.S. Patent Application Publication Nos. 2007/0003656 and 2007/00228590; and Leavitt, U.S. Patent Application Publication No. 2009/0035405. Furthermore, system 10 may include a plurality of extrusion heads 18 for depositing modeling and/or support materials.

The modeling material is supplied to extrusion head 18 from supply source 20 via feed line 30, thereby allowing extrusion head 18 to deposit the modeling material to build 3D model 24. Correspondingly, the soluble support material is supplied to extrusion head 18 from supply source 22 via feed line 32, thereby allowing extrusion head 18 to deposit the support material to build support structure 26. During a build operation, gantry 16 moves extrusion head 18 around in the horizontal x-y plane within build chamber 12, and one or more drive mechanisms (e.g., drive mechanisms 33a and 33b) are directed to intermittently feed the modeling and support materials through extrusion head 18 from supply sources 20 and 22.

The received modeling and support materials are then deposited onto platen 14 to build 3D model 24 and support structure 26 using a layer-based additive manufacturing technique. Support structure 22 is desirably deposited to provide vertical support along the z-axis for overhanging regions of the layers of 3D model 24. This allows 3D object 24 to be built with a variety of geometries. After the build operation is complete, the resulting 3D model 24/support structure 26 may be removed from build chamber 12, and placed in a bath containing an aqueous solution (e.g., an aqueous alkaline solution) to remove support structure 26 from 3D model 24.

The modeling and support materials may be provided to system 10 in a variety of different media. For example, the modeling and support materials may be provided as continuous filament strands fed respectively from supply sources 20 and 22, as disclosed in Swanson et al., U.S. Pat. No. 6,923,634; Comb et al., U.S. Pat. No. 7,122,246; and Taatjes et al., U.S. Pat. Nos. 7,938,356 and 7,938,351. Examples of suitable average diameters for the filament strands of the modeling and support materials range from about 1.27 millimeters (about 0.050 inches) to about 3.0 millimeters (about 0.120 inches). The term "about" is used herein with respect to measurable values and ranges of temperatures due to expected variations known to those skilled in the art (e.g., limitations and variabilities in measurements).

Figure 2:
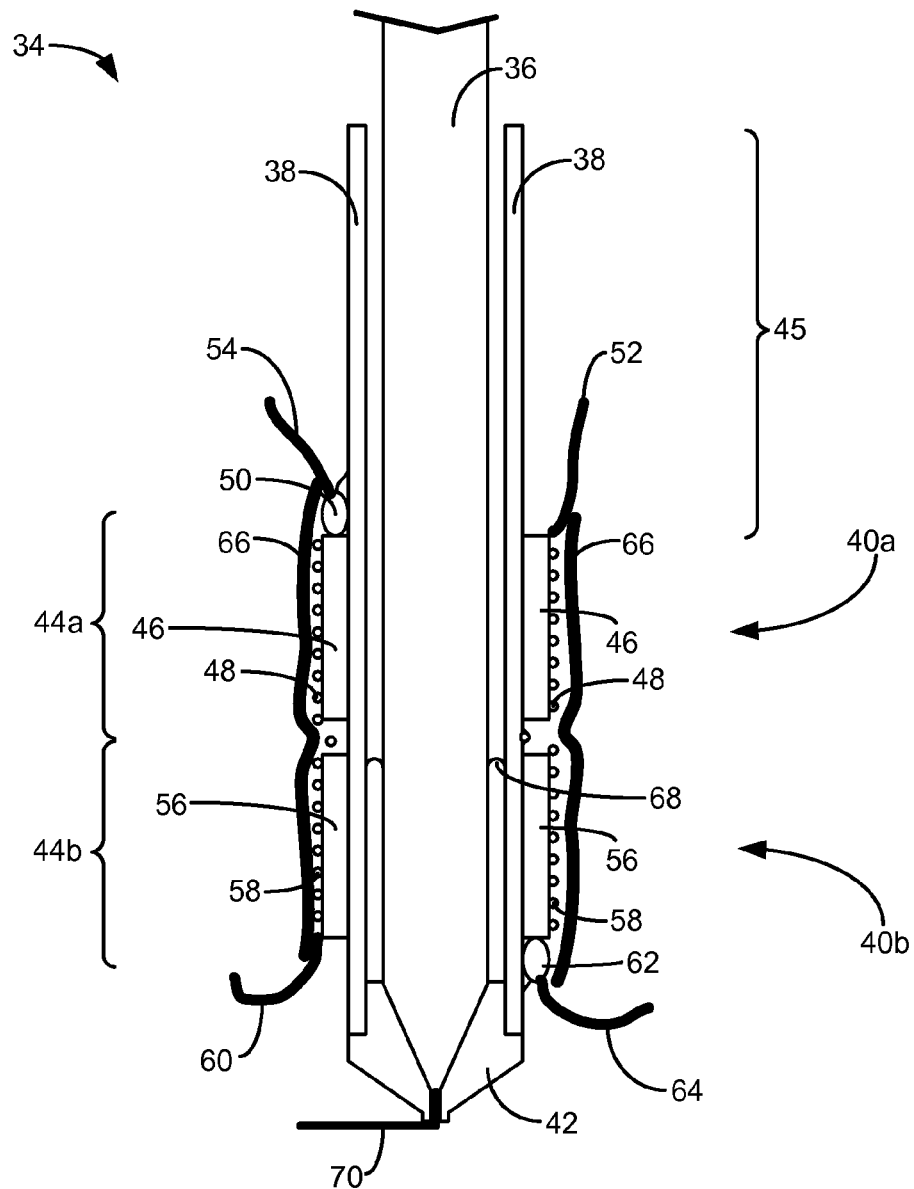
FIG. 2 is a schematic illustration of the liquefier assembly.

FIG. 2 shows liquefier assembly 34 in use with filament 36, where liquefier assembly 34 is a liquefier assembly of extrusion head 18 (shown in FIG. 1) for extruding a material from filament 36. As such, liquefier assembly 34 may be used to deposit the modeling material and/or the support material. Extrusion head 18 desirably includes a separate liquefier assembly 34 for depositing the modeling material and for depositing the support material.

Filament 36 may be fed to liquefier tube 38 from supply source 20 or supply source 22 (shown in FIG. 1) with one or more drive mechanisms (e.g., drive mechanisms 33a and 33b, shown in FIG. 1). Examples of suitable drive mechanisms for use with liquefier assembly 34 include those disclosed in Batchelder et al., U.S. Application Publication No. 2009/0274540; and LaBossiere et al., U.S. Pat. Nos. 7,384,255 and 7,604,470; the disclosures of which are incorporated by reference in their entireties.

As shown in FIG. 2, liquefier assembly 34 includes liquefier tube 38, thermal units 40a and 40b, and extrusion tip 42. Liquefier tube 38 is a thin-walled, thermally-conductive tube, which is desirably electrically grounded. Examples of suitable materials for liquefier tube 38 include stainless steel. Examples of suitable designs for liquefier tube 38 and extrusion tip 42 include those disclosed in Batchelder et al., U.S. Pat. No. 8,439,665; Batchelder et al., U.S. Application Publication No. 2009/0273122; Swanson et al., U.S. Pat. No. 6,004,124; Comb, U.S. Pat. No. 6,547,995; and LaBossiere et al., U.S. Pat. Nos. 7,384,255 and 7,604,470; the disclosures of which are incorporated by reference in their entireties.

Thermal units 40a and 40b are a pair of thermally-conductive units configured to transfer thermal energy to liquefier tube 38 in separate heatable zones (referred to as zones 44a and 44b). While liquefier assembly 34 is shown having two thermal units configured to provide two heatable zones, liquefier assemblies of the present disclosure may alternative include additional numbers of thermal units. Examples of suitable numbers of thermal units and thermal zones range from two to ten. In one embodiment, suitable numbers of thermal units and thermal zones range from two to five. In another embodiment, suitable numbers of thermal units and thermal zones range from two to four. In yet another embodiment, suitable numbers of thermal units and thermal zones range from two to three.

As shown, liquefier tube 38 desirably includes a length (referred to as length 45) between the top end of liquefier tube 38 and the top-most thermal unit (i.e., thermal unit 40a in the shown embodiment). Length 45 desirably prevents filament 36 from melting at the top end of liquefier tube 38. In one embodiment, cooling air may be supplied to the top end of liquefier tube 38 to further reduce the risk of filament 36 from melting at the top end of liquefier tube 38.

In the shown embodiment, thermal unit 40a includes thermal spreader 46, conductive wire 48, and thermistor 50. Thermal spreader 46 is a thermally-conductive sleeve that encases liquefier tube 38 at zone 44a for spreading thermal energy (i.e., heat) from conductive wire 48 to liquefier tube 38. Thermal spreader 46 may be fabricated from one or more thermally-conductive materials, such as aluminum (e.g., anodized aluminum). Conductive wire 48 is wrapped around thermal spreader 46 and receives electrical energy from electrical connection 52 to generate the thermal energy. A portion of conductive wire 48 may also be secured to liquefier tube 38 (e.g., welded to liquefier tube 38), as shown in FIG. 2. Thermistor 50 is a resistor that measures the temperature of zone 44a. As shown, thermistor 50 includes a lead secured to liquefier tube 38 (e.g., welded to liquefier tube 38) and electrical connection 54 for relaying the detected resistance to control 28 (shown in FIG. 1).

Correspondingly, thermal unit 40b includes thermal spreader 56, conductive wire 58 (having electrical connection 60), and thermistor 62 (having electrical connection 64), which function in the same manner as the components of thermal unit 40a for heating and monitoring the temperature of zone 44b. In alternative embodiments, thermistor 50 and/or thermistor 62 may be replaced with one or more thermocouple units for monitoring the temperature of zones 44a and 44b.

Liquefier assembly 34 may also include insulation sleeve 66, which is an electrically-insulative sleeve that desirably wraps around thermal units 40a and 40b. This arrangement allows liquefier tube 38 to be heated in multiple zones (e.g., zones 44a and 44b) based on the independent operation of thermal unit 40a and thermal unit 40b.

During operation, zone 44b (i.e., the lowest zone, closest to extrusion tip 42) is desirably always heated when liquefier assembly 34 is extruding a material. Additional heatable zones above the lowest zone (e.g., zone 44a) may be turned on when extended high flow rate, nearly steady velocity toolpaths are planned for a future time corresponding to the several second thermal diffusion time for heating filament 36 in those upper zone(s).

When preparing to shut off a one or more zones of liquefier assembly 34, the zones away from extrusion tip 42 are desirably shut off first, allowing the meniscus of molten material (referred to as meniscus 68) to move downward towards extrusion tip 42, thereby drying out the upper zone(s). In the shown example, thermal unit 40a is shut off, thereby positioning meniscus 68 at a location at or above thermal zone 44b due to heat being provided solely by thermal unit 40b.

In embodiments in which liquefier assembly 34 includes three or more heatable zones, the thermal units of the topmost zone is desirably shut off first, followed by the adjacent lower thermal unit, in a downward serial manner. Despite this action, it is often the case (particularly with support materials) that filament 36 will adhere to the inner wall of liquefier tube 38 above the lowest zone on start-up. With conventional, single zone liquefiers, this is addressed by over-heating the single zone and shutting off the cooling air to the liquefier. In comparison, with the multiple-zone liquefier assembly 34, start-up may be accomplished by briefly heating all the zones simultaneously (e.g., operating both thermal unit 40a and thermal unit 40b).

During start-up, thermal units 40a and 40b may each be heated to at least partially melt filament 36 within liquefier tube 38. During operation, thermal unit 40a may be turned on and off independently of thermal unit 40b. Accordingly, when controller 28 directs extrusion head 18 to deposit extrudate 70 of a modeling or support material along a toolpath that has numerous stops and start (e.g., when tracing surface details), a fast response time is desired. As such, controller 28 may direct thermal unit 40a to shut off to reduce the heatable length of liquefier assembly 34 generally to the length of liquefier tube 38 at and below zone 44b.

Alternatively, when controller 28 directs extrusion head 18 to deposit extrudate 70 of the modeling or support material along a toolpath that is desirably filled quickly (e.g., through interior fill patterns), fast flow rates of the given material are desired. As such, controller 28 may direct thermal unit 40a to heat zone 44a to increase the heatable length of liquefier assembly 34 generally to the length of liquefier tube 38 at and below zone 44a. This combination allows both fast response times when tracing surface details of 3D model 24 and support structure 26, along with fast deposition rates when filling interior regions of 3D model 24 and support structure 26.

Figure 3:
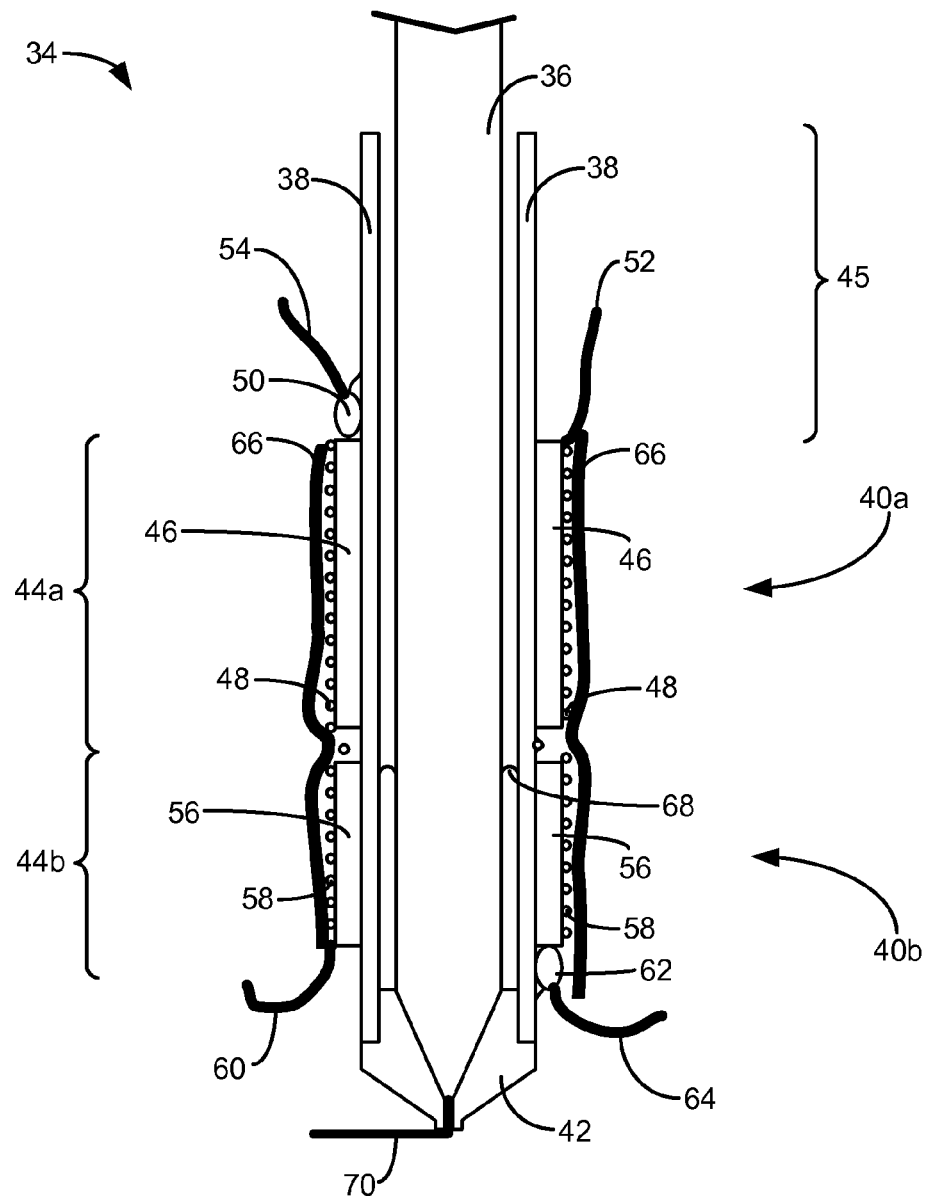
FIG. 3 is a schematic illustration of a first alternative liquefier assembly, which includes heatable zones with different lengths.

In some embodiments, the one or more upper zones may cover longer segments of liquefier tube 38 compared to lower zones. For example, as shown in FIG. 3, thermal unit 40a covers a longer length of liquefier tube 38 compared to the length covered by thermal unit 40b. As such, zone 44a is longer than zone 44b. Examples of suitable lengths for zone 40a range from about 100% of the length of zone 40b to about 500% of the length of zone 40b. In some embodiments, suitable lengths for zone 40a range from about 100% of the length of zone 40b to about 300% of the length of zone 40b. In additional embodiments, suitable lengths for zone 40a range from about 150% of the length of zone 40b to about 250% of the length of zone 40b. In further additional embodiments, the length for zone 40a range is about 200% of the length of zone 40b.

Figure 4:
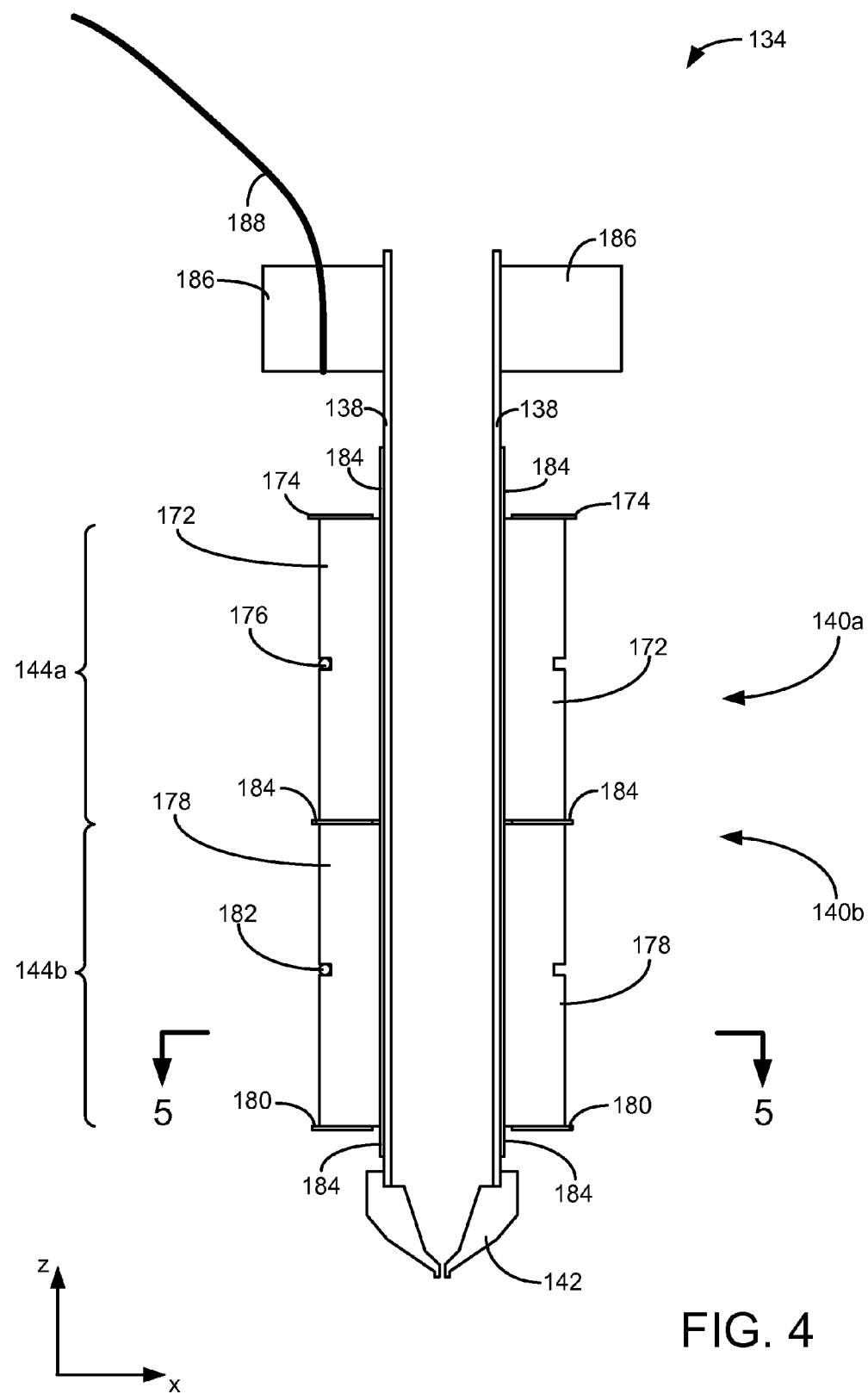
FIG. 4 is a schematic illustration of a second alternative liquefier assembly, which includes modified thermal units.
Figure 5:
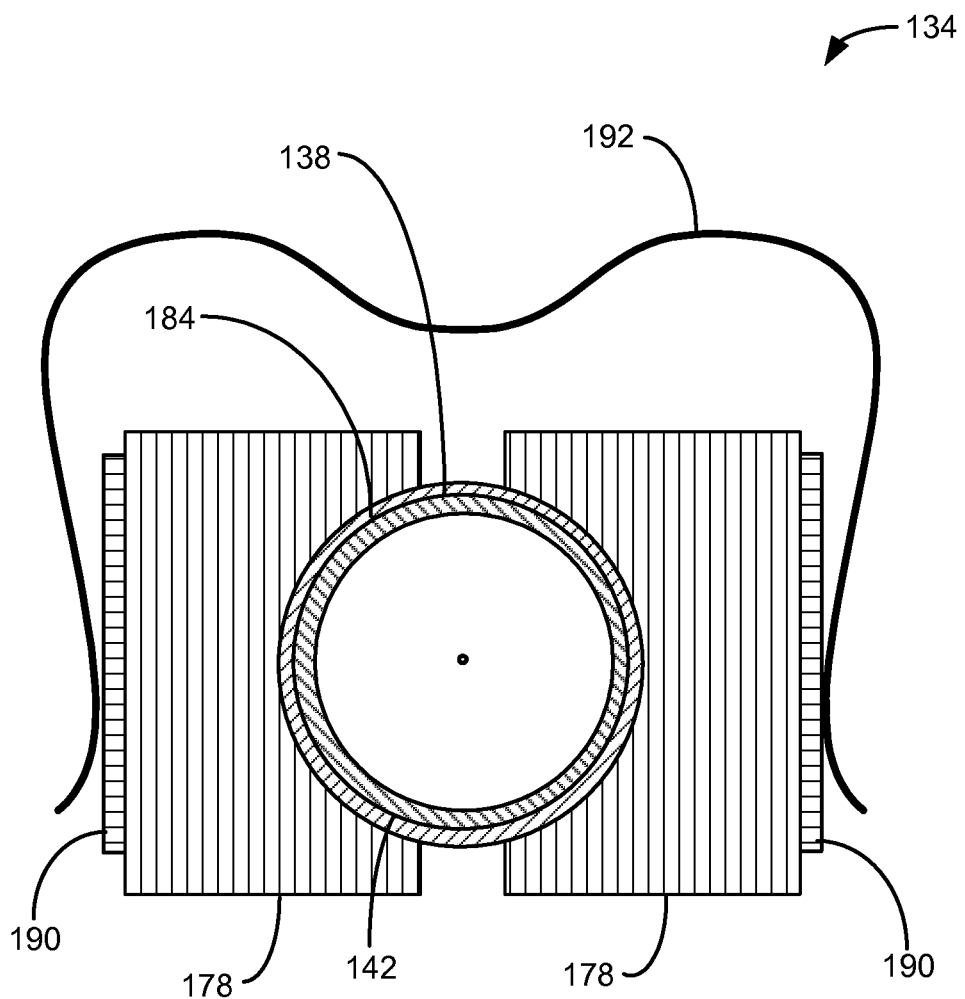
FIG. 5 is a sectional view of section 5-5 taken in FIG. 4.

FIGS. 4 and 5 show an alternative design to the liquefier assemblies shown in FIGS. 2 and 3, which operates under substantially the same mechanics for providing multiple, independently-heatable zones. As shown in FIG. 4, liquefier assembly 134 includes liquefier tube 138 (e.g., a stainless-steel tube), thermal units 140a and 140b, and extrusion tip 142, where thermal units 140a and 140b respectively define heatable zones 144a and 144b. In this embodiment, thermal unit 140a includes thermal block 172, electrode 174, and thermocouple 176. Correspondingly, thermal unit 140b includes thermal block 178, electrode 180, and thermocouple 182. Liquefier assembly 134 also include ground contact 184 disposed longitudinally between thermal blocks 172 and 178.

Thermal blocks 172 and 178 may each be fabricated from one or more thermally-conductive materials. In one embodiment, thermal blocks 172 and 178 are each fabricated from graphite. The use of graphite for thermal blocks 172 and 178 is beneficial due it low material costs, capabilities of handling elevated temperatures, capabilities of being substantially uniform heat generators, and providing good thermal conductivity.

During operation, a first electrical current may be supplied to electrode 180, where the electrical current then flows axially upward through thermal block 178 to ground contact 184, thereby heating thermal block 178. The heat from thermal block 178 is then transferred to liquefier tube 138 at zone 144b. Correspondingly, a second electrical current may be supplied to electrode 174, where the electrical current then flows axially downward through thermal block 172 to ground contact 184, thereby heating thermal block 172. This heats zone 144a in a manner that is independent from the heating of zone 144b.

Thermocouples 176 and 182 independently sample the temperatures of thermal blocks 172 and 178. The outputs from thermocouples 176 and 182 may be used by controller 28 (shown in FIG. 1) to control the current flow through electrodes 174 and 180 based on target temperatures for zones 144a and 144b, respectively.

Liquefier assembly 134 may also include insulation sleeve 184 disposed between liquefier tube 138 and thermal units 140a and 140b. Examples of suitable materials for insulation sleeve 184 include one or more electrically-insulative materials, such as ceramic materials and/or aluminum oxide. Above insulation sleeve 184, liquefier assembly 134 may also include cold block 186, which contains an embedded heat pipe 188. This causes the top end of liquefier tube 138 to be well below the softening point of the modeling or support material being fed to liquefier assembly 134.

During a fast interior fill of either 3D model 24 or support structure 26, zones 144a and 144b may be heated in parallel, as discussed above for liquefier assemblies 34 (shown in FIGS. 2 and 3). This provides a relatively long heated length for liquefier assembly 134, which provides larger peak flows and slower time responses. Since this is for interior fill, some degradation in seam quality is tolerable for higher deposition rates.

Alternatively, when extrusion head 18 is building surface roads with feature details, zone 144a is desirably unheated and zone 144b is desirably heated. As discussed above, this provides faster response times, with reduced peak flow rates. These parameters are acceptable when building detailed features, such as surface features.

As shown in FIG. 5, liquefier assembly 134 may also include outer insulation sleeve 190 and clip 192. Outer insulation sleeve 190 desirably extends around thermal units 140a and 140b, and may also be fabricated from one or more electrically-insulative materials, such as ceramic materials and/or aluminum oxide. Clip 192 is a biasing clip configured to securely retain thermal units 140a and 140b, and insulation sleeves 184 and 190 against liquefier tube 138.

The above-discussed liquefier assemblies of the present disclosure provide multiple heatable zones, where the temperature within a given zone is substantially uniform while temperatures of adjacent zones may vary. The liquefier assemblies allow controller 28 to regulate the temperature of each zone, along with capabilities of preventing filaments of the modeling and support materials from melting at the top ends of the liquefier tubes. Furthermore, controller 28 is desirably configured to direct how many zones should be operating for a given toolpath, based on the type of toolpath being followed.

Suitable modeling materials for use with the liquefier assemblies of the present disclosure include polymeric and metallic materials. In some embodiments, suitable modeling materials include materials having amorphous properties, such as thermoplastic materials, amorphous metallic materials, and combinations thereof. Examples of suitable thermoplastic materials for ribbon filament 34 include acrylonitrile-butadiene-styrene (ABS) copolymers, polycarbonates, polysulfones, polyethersulfones, polyphenylsulfones, polyetherimides, amorphous polyamides, modified variations thereof (e.g., ABS-M30 copolymers), polystyrene, and blends thereof. Examples of suitable amorphous metallic materials include those disclosed in U.S. Pat. No. 8,215,371.

Suitable support materials for use with the liquefier assemblies of the present disclosure include materials having amorphous properties (e.g., thermoplastic materials) and that are desirably removable from the corresponding modeling materials after 3D model 24 and support structure 26 are built. Examples of suitable support materials include water-soluble support materials commercially available under the trade designations "WATERWORKS" and "SOLUBLE SUPPORTS" from Stratasys, Inc., Eden Prairie, Minn.; break-away support materials commercially available under the trade designation "BASS" from Stratasys, Inc., Eden Prairie, Minn., and those disclosed in Crump et al., U.S. Pat. No. 5,503,785; Lombardi et al., U.S. Pat. Nos. 6,070,107 and 6,228,923; Priedeman et al., U.S. Pat. No. 6,790,403; and Hopkins et al., U.S. Pat. No. 8,246,888.

Although the present disclosure has been described with reference to preferred embodiments, workers skilled in the art will recognize that changes may be made in form and detail without departing from the spirit and scope of the disclosure.

The invention claimed is:

1. An extrusion-based additive manufacturing system comprising:
a filament drive mechanism configured to feed a filament of a consumable material;
a liquefier having an inlet end and an outlet end offset along a longitudinal length;
an extrusion tip secured to the outlet end of the liquefier;
a first thermal unit operably secured to the liquefier;
a second thermal unit operably secured to the liquefier;
a third thermal unit operably secured to the liquefier such that the first thermal unit, the second thermal unit, and the third thermal unit are positioned along the longitudinal length of the liquefier between the inlet end and the outlet end of the liquefier;
at least one electrically-insulative sleeve extending at least partially around all of the first thermal unit, the second thermal unit, and the third thermal unit; and
a controller configured to operate the filament drive mechanism to feed the filament to the inlet end of the liquefier, and to independently operate each of the first thermal unit, the second thermal unit, and the third thermal unit to produce independently heatable zones along the longitudinal length of the liquefier for melting the consumable material of the fed filament in the liquefier.

2. The system of claim 1, wherein the first thermal unit comprises:
a first thermally-conductive component in thermal contact with an outer surface of the liquefier; and
a first electrically-conductive component configured to heat the first thermally-conductive component.

3. The system of claim 2, wherein the first thermal unit further comprises a first temperature sensor configured to detect an electrical resistance of the first thermally-conductive component, and to relay the detected electrical resistance to the controller.

4. The system of claim 2, wherein the second thermal unit comprises:
a second thermally-conductive component in thermal contact with the outer surface of the liquefier; and
a second electrically-conductive component configured to heat the second thermally-conductive component.

5. The system of claim 4, wherein the second thermal unit further comprises a second temperature sensor configured to detect an electrical resistance of the second thermally-conductive component, and to relay the detected electrical resistance to the controller.

6. The system of claim 1, wherein the controller is configured to independently operate each of the first thermal unit, the second thermal unit, and the third thermal unit in a manner that comprises shutting down the first thermal unit, the second thermal unit, and the third thermal unit in a downward serial manner.

7. The system of claim 1, wherein the at least one electrically-insulative sleeve comprises a ceramic material.

8. The system of claim 1, wherein the controller is configured to independently operate each of the first thermal unit, the second thermal unit, and the third thermal unit in a manner that comprises directing how many of the independently heatable zones are to be operated based on a toolpath to be followed.

9. An extrusion-based additive manufacturing system comprising:
- a filament drive mechanism configured to feed a filament of a consumable material;
- a liquefier having an inlet end and an outlet end offset along a longitudinal length;
- an extrusion tip secured to the outlet end of the liquefier;
- three or more thermal units operably secured to the liquefier at different locations along the longitudinal length of the liquefier between the inlet end and the outlet end of the liquefier; and a controller configured to operate the filament drive mechanism to feed the filament to the inlet end of the liquefier, and to independently operate each of the three or more thermal units to produce independently heatable zones along the longitudinal length of the liquefier for melting the consumable material of the fed filament in the liquefier; and
- at least one electrically-insulative sleeve extending at least partially around all of the three or more thermal units.

10. The system of claim 9, wherein each of the three or more thermal units comprises:
- a thermally-conductive component in thermal contact with an outer surface of the liquefier;
- an electrically-conductive component configured to heat the thermally-conductive component; and
- a temperature sensor configured to detect an electrical resistance of the thermally-conductive component, and to relay the detected electrical resistance to the controller.

11. The system of claim 10, wherein the electrically-conductive component comprises a wire wrapped around at least a portion of the thermally-conductive component.

12. The system of claim 9, wherein the at least one electrically-insulative sleeve comprises a ceramic material.

13. The system of claim 9, wherein the liquefier includes a length portion along the longitudinal length between the inlet end of the liquefier and a top-most thermal unit of the three or more thermal units.

14. The system of claim 9, wherein the controller is configured to independently operate each of the three or more thermal units in a manner that comprises shutting down the three or more thermal units in a downward serial manner.

15. An extrusion-based additive manufacturing system comprising:
- a filament drive mechanism configured to feed a filament of a consumable material;
- a liquefier having an outer surface, an inlet end, and an outlet end offset along a longitudinal length from the inlet end;
- an extrusion tip secured to the outlet end of the liquefier;
- three or more thermal units positioned along the longitudinal length of the liquefier between the inlet end and the outlet end of the liquefier, wherein each of the three or more thermal units comprises:
  - a thermally-conductive component in thermal contact with an outer surface of the liquefier;
  - an electrically-conductive component configured to electrically heat the thermally-conductive component; and
  - an electrical connection configured to relay electrical power to the electrically-conductive component; and
- at least one electrically-insulative sleeve extending at least partially around all of the three or more thermal units;
- a controller configured to operate the filament drive mechanism to feed the filament to the inlet end of the liquefier, and to independently operate each of the three or more thermal units to produce independently heatable zones along the longitudinal length of the liquefier for melting the consumable material of the fed filament in the liquefier.

16. The system of claim 15, wherein each of the three or more thermal units further comprises a temperature sensor configured to detect an electrical resistance of the thermally-conductive component, and to relay the detected electrical resistance to the controller.

17. The system of claim 15, wherein the controller is configured to independently operate each of the three or more thermal units in a manner that comprises shutting down the three or more thermal units in a downward serial manner.

18. The system of claim 15, wherein the at least one electrically-insulative sleeve comprises a ceramic material.

19. The system of claim 15, wherein the controller is configured to independently operate each of the three or more thermal units in a manner that comprises directing how many of the independently heatable zones are to be operated based on a toolpath to be followed.

20. The system of claim 15, wherein the liquefier includes a length portion along the longitudinal length between the inlet end of the liquefier and a top-most thermal unit of the three or more thermal units.

* * * * *